March 2, 1971 I. G. NICHOLS 3,567,544
METHOD OF HOT MELT SEAMING OF FABRIC MATERIALS
USING A HIGH FREQUENCY ELECTRIC FIELD
Filed Dec. 22, 1967

United States Patent Office 3,567,544
Patented Mar. 2, 1971

3,567,544
METHOD OF HOT MELT SEAMING OF FABRIC MATERIALS USING A HIGH FREQUENCY ELECTRIC FIELD
Iven G. Nichols, Pompton Plains, N.J., assignor to Standard Brands Chemical Industries, Inc., Dover, Del.
Filed Dec. 22, 1967, Ser. No. 693,013
Int. Cl. B32b 5/08
U.S. Cl. 156—176                    12 Claims

ABSTRACT OF THE DISCLOSURE

The continuous, rapid forming of a hot melt bonded seam in articles of fabric material by first constructing a multi-ply assemblage of fabric material with a thermoplastic filament between the plies and passing the multi-ply assemblage through a high frequency electrical field that will instantly melt selectively the filament while the multi-ply assemblage is compressed so as to cause the melted filament to penetrate evenly the fabric plies; and the seam bonded articles produced by this process.

An apparatus that continuously and rapidly produces hot melt seam bonding of plies of fabric material having means for forming a continuous multi-ply assemblage of fabric material, the positioning of a thermoplastic filament along a line of desired seam bonding in the assemblage, and means for passing the multi-ply assemblage through a high frequency electrical field that is attuned to melt selectively the filament while pressure is applied to compress the multi-ply assemblage.

---

This invention is a seam bonding of plies of fabric material, such as woven or nonwoven fabrics, along a line of desired attachment by selectively melting a thermoplastic filament positioned between plies of the material as they are passed through an electrical field of selective high frequency to produce a narrow, thin, tip hot melt seam that unites the plies.

Many methods have been proposed for hot melt bonding of plies of material to form a seam or edge between the plies. One well-known method is to form the bond or seam by applying a molten layer of hot melt adhesive to one ply and then press another ply against it to form the bond. Another method of bonding plies together is to form a seam from strands, strings and cords that are coated with a hot melt plastic so that, when they are positioned between plies of material and heated, the coating melts and becomes the adhesive that bonds the plies together.

Another method is described in U.S. Patent No. 2,394,532 where heavy-duty work gloves are made by bonding their seams together with a thermoplastic or thermosetting welt. The welt is fed into the seam, and the welt and the glove material are heated by induction of dielectric heating to form the bond with both the welt and the material attracting the high frequency field to form a heavy seam. Still another method for bonding plies of material is described in U.S. Patent No. 2,592,463. Two plies of material are superimposed so that their edge portions are in juxtaposition, and a thermoplastic binding strip is placed between the edge portions. The superimposed material is then passed between a pair of high tension electrodes, and the resulting spark fuses the binding strip and causes it to adhere to the fabric sections. The fabric sections are then sewed together with an overseam or similar type of stitching.

Advantageously, this invention overcomes the disadvantages of the prior art by producing in a rapid manner a continuous thin, flat seam that is instantly formed to seam bond fabric material without changing the material that forms the plies, which seaming has exceptional flexibility, superior strength, good hand and softness. This invention contemplates a unique method for continuous, instant hot melt seam bonding of fabric materials by first forming a multi-ply assemblage of plies of fabric materials with a thermoplastic filament positioned between the plies and passing the assemblage through a high frequency electrical field that is adjusted to melt selectively the filament while the plies are under compression so as to form a seam bonding along the line where the filament was positioned.

Also contemplated is an apparatus for producing the hot melt seam bonding by the method above stated. The apparatus provides means to form a multi-ply assemblage with a thermoplastic filament between the plies, means for conveying at a rapid rate the assemblage through a bonding zone which has an electrical field in it of a selective high frequency that will melt the filament but not the fabric, and means for compressing the plies during their passage through the bonding zone so that the selectively melted filament is forced to penetrate into the body portion of the plies and thus instantly bond the plies together along a seam-line corresponding to the position of the filament, without causing heat damage to the fabric material in the plies.

The bonded article produced by this invention provides a narrow, flat seam that is strong and resistant to lateral stress or pull. This bonded seam is particularly adaptable to joining plies of nonwoven fabric material where sewing cannot provide a seam that is as strong and durable as the hot melt bonded seam of this invention. Another object is the forming of a hot melt seam that, in addition to being stronger and more durable, can replace conventional types of sewing in that the seam can be formed instantly so as to make possible the seaming of fabrics at a rate faster than heretofore. In addition, the seaming process above described provides for the securing together of non-woven fabrics and the like that do not lend themselves to direct, simple, thin-line seaming because of their lack of strength due to random placement of short fibers in a web which generally requires additional reinforcing or other strengthening processes that make the seaming of non-woven fabrics slow and which make the finished seam cumbersome and unattractive.

It will be appreciated that the bonded seams formed by the method of this invention can be used in the fabrication and assembly of all types of wearing apparel and a variety of household and commercial articles, whether made of woven or nonwoven fabric-like material, particularly for apparel and articles where quickly produced, strong seaming is required. This seaming is also suitable for articles made of thin fabric as well as paper products such as throw-away articles that must be seam bonded together with sufficient seam strength to last until the article is discarded. Garments made of paper and other nonwoven fabrics, such as dresses, undergarments, bathing suits, suits, skirts, and the like, are particularly suitable to be formed by the method of this invention.

The bonded seam thus produced provides a very good hand, is flexible and resistant to wear stress and strain, and the process makes possible the seaming of fabrics that have been difficult or impossible to sew because of their fragile nature. In addition, the seaming of this invention provides for continuous and semi-continuous seaming at a rapid rate, which makes possible more economical fabrications of articles as well as fabrication from materials heretofore not considered economical to use or to sew.

It will be appreciated that by the selection of a thermoplastic filament having a greater resistance to a selected high frequency field than the fabric to be hot melt seam bonded, the bonding can be accomplished without causing changes to the properties of the fabric and in a quick and easy manner.

Further objects of this invention will be appreciated from the description of the accompanying drawings, in which.

Figure 1:
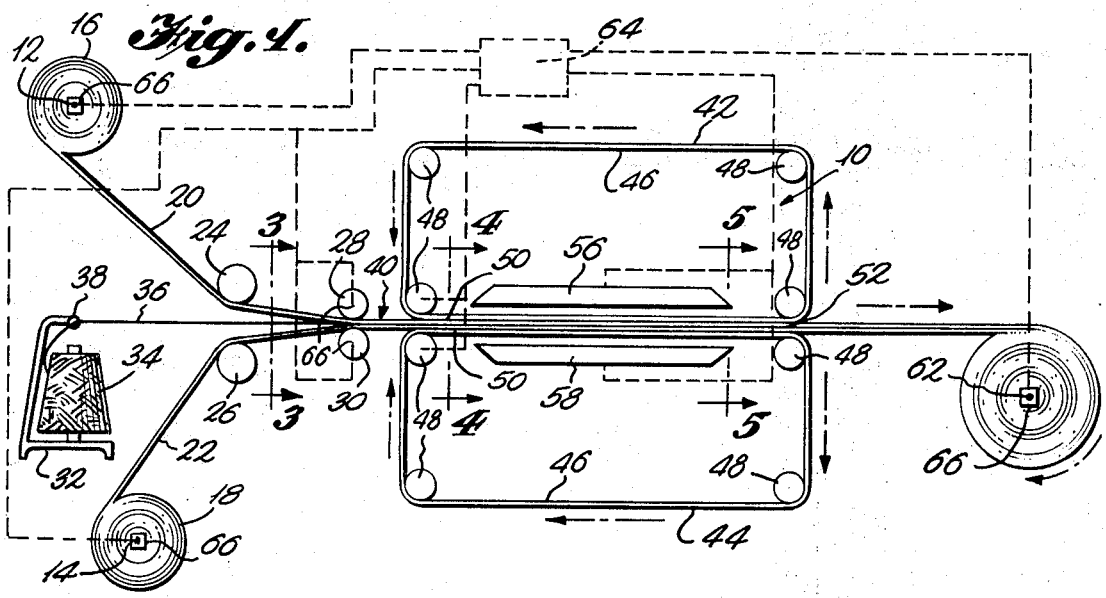
FIG. 1 is a schematic representation of an apparatus that may be used to carry out methods of this invention.
Figure 2:
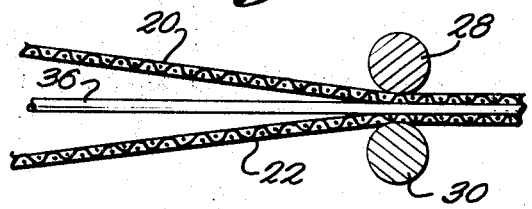
FIG. 2 is an enlarged side cross-sectional view showing the relative positions of the plies of fabric material to be seam bonded and the thermoplastic filament used to bond plies together.
Figure 3:
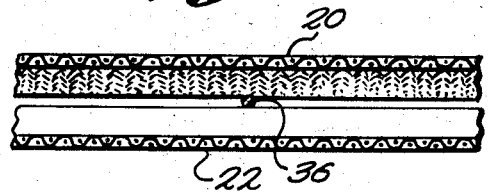
FIG. 3 is a cross-sectional view taken on line 3—3 of FIG. 1 showing the thermoplastic filament and the plies of fabric material just before they enter rolls that bring the plies together to form a multi-ply assemblage.
Figure 4:
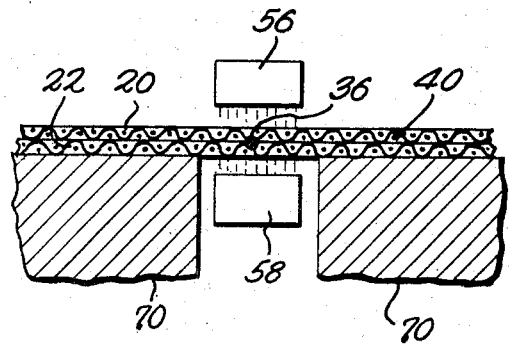
FIG. 4 is a cross-sectional view taken on line 4—4 of FIG. 1 showing the multi-ply assemblage before entering the bonding zone.
Figure 5:
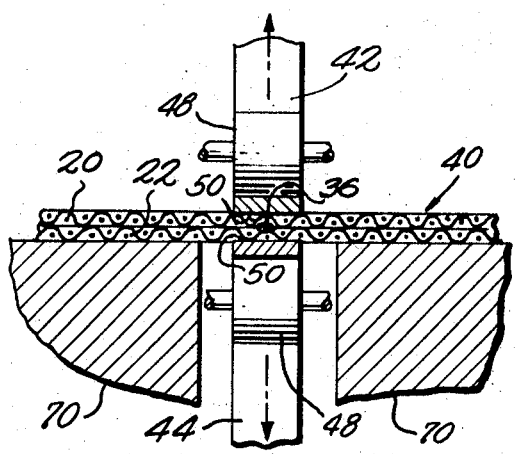
FIG. 5 is a cross-sectional view taken on line 5—5 of FIG. 1 showing the multi-ply assemblage after passage through the bonding zone.

Referring to the drawings, numeral 10 designates a typical hot melt seam bonding apparatus for producing a seamed article from plies of fabric material that are bonded together along a desired line of attachment. The seam bonded article so produced has a thin, neat, strong seam poining plies of fabric along this line of attachment. This apparatus 10 has two roller trunnions 12, 14 positioned one above the other, each supporting a roll of fabric or fabric-like material 16, 18 respectively. The fabric or fabric-like material may be any suitable nonwoven or woven fabric material or film that is receptive to hot melt seam bonding. The two rolls of fabric 16, 18 continuously supply plies 20, 22 of the material for the bonding operation, in the form of webs or sheets. A pair of guide rollers 24, 26 are positioned so as to assist in directing and converging the plies to and between a set of feed rollers 28, 30.

Positioned between the two roll of fabric is a filament cone support base 32 that holds a cone 34 of a continuous thermoplastic filament 36. The filament is unwound from the cone and passed through a guide ring 38 which controls the unwinding and directs the positioning of the filament between plies 20, 22 to form a multi-ply assemblage 40 of superimposed sheets or webs of the fabric with the filament therebetween posiitoned along a line of desired seam bonding.

A pair of continuous belt conveyors 42, 44 are positioned one above the other. Each belt conveyor has a continuous belt 46 which travels over a set of advancing rollers 48 so arranged as to present a flat horizontal surface 50. Each continuous belt conveyor is wider than the width of the area to be seamed. The belt conveyors are positioned one over the other so that the bottom flat horizontal surface of the top conveyor is spaced from the flat horizontal top surface of the bottom conveyor by a distance sufficient to delne an elongated slot 52 that can be adjusted to accommodate the thickness of the multi-ply assemblage. The top conveyor belt travels in a counterclockwise direction while the bottom conveyor belt travels in a clockwise direction so that the confronting flat horizontal surfaces 50 of the belts travel in the same direction and provide a means for carrying the multi-ply assemblage through the elongated slot 52. The position of the belt conveyors 42, 44 can be adjusted relative to each other so as to vary the width of slot 52 and thus provide the desired pressure on both sides of the multi-ply assemblage to compress it as it passes through the slot during the instant melting of the filament (see FIG. 1).

Positioned within the open areas of the conveyor belts 42, 44 are upper and lower electrodes 56 and 58, respectively, that form between them a bonding zone 60. The electrodes are arranged to produce a high frequency electrical field that can be controlled so as to selectively melt the filament but not the fabric as the assemblage passes through the bonding zone. The field passes through a portion of the elongated slot 52 that is between the adjacent surfaces of the electrodes 56, 58 so that the thermoplastic filament positioned between the plies of fabric is instantly melted as it passes rapidly through the field. Thus, the multi-ply assemblage is continuously and rapidly being conveyed by the belt conveyors 42, 44 through slot 52 and the field provided by electrodes 56, 58 where the filament is instantly melted while compression is exerted upon the multi-ply assemblage to force the melted filament into interstices of the fabric material, thereby forming a unique, thin, strong bond. After passage from slot 52, the seam bonded multi-ply assemblage is collected in roll form on take-up roller 62.

A suitable table or support frame 70 (partially shown) may be provided to support the multi-ply assemblage of the fabric material in a flat horizontal position so that only the area to be seam bonded is in contact with the surfaces of the conveyor and conveyed through the slot 52. The table extends outwardly from each side of the bottom conveyor belt with its surface substantially parallel with the upper surface of the bottom conveyor belt. In this arrangement, the assemblage slides over the surface of the table while the area to be bonded passes through slot 52 where the bonding takes place.

A contrrol unit 64 is provided and is connected to the drive mechanisms 66 that drives the roller trunnions 12 and 14, feed rollers 28, 30, and take-up roller 62 to control the rate of feed of each of the plies and the assemblage to, through, and from the bonding zone 60. The filament, being sandwiched between adjacent plies, is unwound by the travel of the multi-ply assemblage as it passes through the bonding zone. The control unit 64 may be adjusted so as to set the speeds of each of the rollers so that the relative linear speed of the filament in relation to the fabric in the bonding zone is approximately zero and the residence time in the bonding zone is sufficient to permit the melting of the filament.

The control unit 64 also controls a field generator which energizes electrodes 56, 58 so that the frequency of the field between the electrodes may be varied to provide the required frequency to melt a filament having a specific resistance.

FIGS. 2, 3, 4 and 5 show the plies of fabric with the thermoplastic filament between them before being formed into a multi-ply assemblage, in a multi-ply assemblage before bonding, and the assemblage after bonding to produce the smooth seam in which the molten filament partially or completely penetrates the fabric to form a thin, strong seam.

The qualities of this thin, strong seam are enhanced during bonding by the application of pressure from the conveyor belts, whose surfaces, as they conduct the assemblage through slot 52, are pressing on the plies of fabric. The pressure applied by the conveyor belts forces the molten thermoplastic into the interstices of the fabric and provides an ironing effect upon the outside surface of the plies as they travel through the high frequency field.

In the bonding operation, the frequency of the electrical field is selected so that it will induce heat only in the filament since the filament has a selected higher resistance than fabric material forming the plies. Thus, when the plies are passed through the high frequency field, only the filament, due to its higher electrical resistance, has heat instantly induced in it to produce its melting. This selective high frequency field produces rapid melting necessary for the forming of a thermoplastic seam and is therefore particularly adaptable for use in the bond seaming of heat-sensitive fabric material.

Advantageously, a number of thermoplastic polymers may be used to form the filament which meet the criteria for the invention as discussed above. Polyesters, such as the polymers produced from aliphatic glycols and a mixture of aromatic dicarboxylic acids in particular, are effective, e.g., PA-Polyester, a polymer of ethylene and tetramethylene glycols with terephthalic acids. Polyesters such as polyethylene terephthalate also may be used, and other polymeric material may be used to form the filament that have an electrical resistance greater than the fabric to be seam bonded.

It will be appreciated that the filament made from thermoplastic polymers produces an instant bond upon being heated and melted; by the pressure exerted on both sides of the fabric plies; and by the cooling that solidifies the melted filament after passage from the selective high frequency field rather than by a cross-linking process or by other forms of chemical reactions. Also, the filament of these polymers may be solid monofilament threadlike structures prior to heating and reversible after melting and flowing into the interstices of the fabric plies to form a strong bond. They melt sharply, flow freely, and then solidify rapidly. The filaments may have many cross-sectional configurations, such as round, square, polygonal, or the like, and can be formed from straight or twisted strands of thermoplastic.

The fabric plies to be seam bonded by the method of this invention advantageously include woven, knitted, and nonwoven fabric, such as fibrous webs, sheet, or mats. The fabric may be made from synthetic and/or natural fibers.

Exemplary of the type of fabric material that can be bonded by the process of this invention are cotton, rayon, nylon, silk, jute, wool, linen, wood fibers, paper, cardboard, felt, and the like. Moreover, it will be appreciated that fabric material made from thermoplastic fibers, e.g. Dacron, Orlon, Acrilan, Dynel, nylon, or any synthetic or natural film material may be bonded when the frequency of the field is adjusted to melt the preformed thermoplastic filament without substantially heating or melting the fabric material in the sheets or webs to be seam bonded. It will be further appreciated that the fabric plies each can be made from a different type of material, so long as each has a lower electrical resistance than the bonding filament so that only the filament is melted during the instant bonding operation.

The high frequency field utilized to heat the preformed thermoplastic filament may be produced by a conventional field generating apparatus that will produce a high frequency field whose frequency can be adjusted. Also the electrodes 56, 58 can be of any size or shape that will produce the necessary gap between them for imposing a high frequency field therebetween through which the assemblage passes. Also the width of the electrodes may be varied according to the width area to be bonded and the length may be varied to provide a field of sufficient length to accommodate the ranges of linear assemblage speed desired to be handled on a particular apparatus design.

It has been found that the mean diameter of the thermoplastic filament employed in the hot melt bonding process of this invention is particularly effective in the range of from about 10 to about 30 mils. The particular diameter to be used depends of course on the fabric weight of the plies to be seam bonded. The heavier the fabric, the greater the mean diameter of the filament. It will be appreciated that selection of the mean diameter of the filament in a specific application will also depend on the required frequency to be used that will melt the filament, the nature of the fabric to be bonded, the physical and chemical properties of both the fabric to be bonded and the filament that melts to bond the fabric.

In general, it has been found that diameters of the filament of about 12 mils can be successfully used for lightweight material such as the fabrics made from fine denier yarns, and above 12 to about 18 mils diameter filament for medium weight fabrics such as for suits and other like garments and articles, and 20 mils or more for heavier or coarse fabric, such as used in draperies, upholstery, and the like. Also, the cross-section of the filament may be of any shape or type of cross-section and configuration which provides an average or effective diameter which when melted will produce a thin, neat seam bonding of the fabric plies.

As discussed above, to facilitate dielectric heating and instant melting of the filament, it is necessary that the filament have a high resistance to electrical current, whereas the fabric plies to be seam bonded have substantially no resistance or a relatively low resistance to the electrical current. In this way, the filament is heated instantly to a melt temperature without adverse heating of the fabric when it is passed through the selective high frequency electrical field. Good results have been produced in the melting of the filament when a field having a frequency of from 30 to 50 megacycles was used. It has been found that as little as one-tenth of a second exposure in the high frequency field brings about the melting of the filament; however, particularly good results have been obtained with the range of one-tenth to one-quarter second. It has also been found that a feed rate of about 100 to about 1000 inches per minute, and an electrical high frequency field of from 30 to 50 cycles per minute produce a good instant bonding in a rapid and effective manner.

The invention will be further understood by reference to the following examples.

EXAMPLE I

Using the apparatus illustrated in FIG. 1, two fibrous sheets of paper were bonded together by the use of a PA-Polyester [1] monofilament having a mean diameter of 12 mils. The paper sheets in the form of a two-ply assemblage with the polyester monofilament between them were fed to the bonding zone at a speed of 800 inches per minute, with a residence time in the bonding zone of one-fourth second, the zone having generated therein a high frequency electrical field of 30 megacycles per second.

The seam bonded paper was tested and found to have a seam that exhibited high bond strength with a good hand and flexibility. The test also showed that the bond strength was substantially in excess of the tensile strength of the paper since the paper ruptured before the seam could be parted when a lateral tensile force was applied to the paper in an effort to part the seam.

EXAMPLE II

Following the procedures outlined in Example I and using the same apparatus, a series of different fabrics were seam bonded using different diameter filaments, feed rates and field frequencies. The thermoplastic seam bond was produced between two plies of the fabrics. The following tabulation shows the results of the bonding:

| Bonded fabric | Monofilament Type | Diameter, mils | Feed rate, in./min. | Frequency of field, megacycles/second |
|---|---|---|---|---|
| Paper fabric | PA* | 12 | 600 | 35 |
| Cotton, heavy | PA* | 20 | 800 | 45 |
| Nylon | PA* | 20 | 800 | 45 |
| Kraft paper | PA* | 17 | 300 | 50 |

*A polymer of ethylene and tetramethylene glycols with terephthalic acids.

When all of the above bonded fabrics were tested, each exhibited effective high bond strength along the seam, the thermoplastic seams had good hand, and the fabric exhibited no scorching or other adverse effect.

Thus it can be seen from the above examples that the method and apparatus of this invention provide an effective hot melt seam bonding of fabric material and, in particular, heat-sensitive fabric materials at rates that are substantially greater than obtained by conventional

[1] A polymer of ethylene and tetramethylene glycols with terephthalic acids.

sewing techniques while still producing a strong and durable seam.

It will be appreciated that the method of this invention is suitable for producing a continuous thermoplastic seam on the edges, and at spaced locations in the body of fabrics of various shapes and sizes, and that the method can be employed to manufacture garments in a manner similar to conventional sewing techniques. The invention also is suitable for producing multi-laminate fibrous products by bonding several fibrous layers together with one or more filaments being bonded to each layer, and it has been found that the method is adaptable to multiple seams in a single pass and to the formation of curved or linear design types of seams.

It will be appreciated that the process of this invention may be carried out in a continuous or semi-continuous manner or may be accomplished by hand feeding the fabric multiply assemblage into a bonding zone.

Although many of the novel features of the invention have been shown and described, it is to be understood that various modifications and substitutions may be made without departing from the spirit and scope of the invention.

What is claimed is:

1. A method for continuously bond seaming a multi-ply assemblage of fabric material to produce a thin hot melt bond of the plies which comprises forming a multi-ply from sheets of fabric material, positioning a preformed thermoplastic filament having a mean diameter of from about 10 to about 30 mils and having a higher electrical resistance than the fabric material between the plies in contact with the opposing surfaces of each fabric, generating an electrical high frequency field that is selective to heat and instantly to melt the filament without adversely heating the adjacent fabric material as the assemblage is passing therethrough, compressing the fabric in the multi-ply assemblage as its passes through the high frequency field to form a thin seam from the filament and withdrawing the seam bonded multi-ply assemblage from the high frequency field.

2. The method of claim 1 in which the thermoplastic filament is made of a polyester polymer prepared from aliphatic glycols and mixtures of aromatic dicarboxylic acids.

3. The method of claim 1 in which the multi-ply assemblage includes nonwoven, woven, knitted fabrics or mixtures thereof, and the fabrics are made from synthetic or natural fibers or mixtures thereof.

4. The method of claim 1 in which the multi-ply assemblage has heat-sensitive fibers therein.

5. The method of claim 1 in which the multi-ply assemblage is formed from two plies of fabric material.

6. The method of claim 1 in which the multi-ply assemblage is bonded continuously at a rate of from about 100 to about 1000 inches per minute.

7. The method of claim 1 in which the thermoplastic filament is heated, melted and solidified to form the seam within a period of from about one-tenth to about one-fourth second.

8. The method of claim 1 in which the selective high frequency field has a frequency of from about 30 to about 50 megacycles per second.

9. The method of claim 1 in which the cross-sectional area of the filament is substantially round.

10. The method of claim 1 in which the preformed filament is formed from twisted strands.

11. The method of claim 1 in which the thermoplastic filament is a preformed monofilament.

12. The method of claim 11 in which the preformed monofilament is a solid, flexible slender strand.

References Cited

UNITED STATES PATENTS

| | | | |
|---|---|---|---|
| 2,550,006 | 4/1951 | Dreyfus | 156—273 |
| 2,660,660 | 11/1953 | Hauteville | 156—273X |
| 2,684,319 | 7/1954 | Arnold | 156—273X |
| 2,992,958 | 7/1961 | Yamaguchi | 156—273 |
| 3,232,810 | 2/1966 | Reesen | 156—273 |
| 3,345,226 | 10/1967 | Frenkel et al. | 156—273X |
| 3,403,064 | 9/1968 | Bellamy | 156—273 |
| 3,454,442 | 7/1969 | Heller | 156—273 |

FOREIGN PATENTS

| | | | |
|---|---|---|---|
| 601,256 | 5/1948 | Great Britain | 156—273 |

BENJAMIN R. PADGETT, Primary Examiner

U.S. Cl. X.R.

156—273, 274, 295 309